Patented June 23, 1931

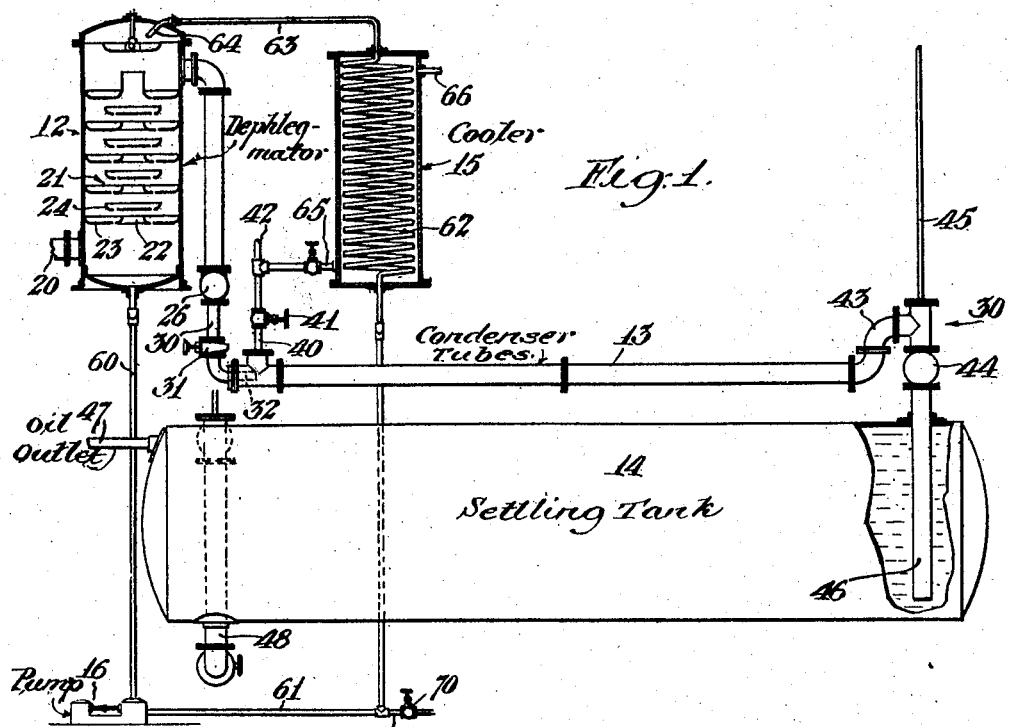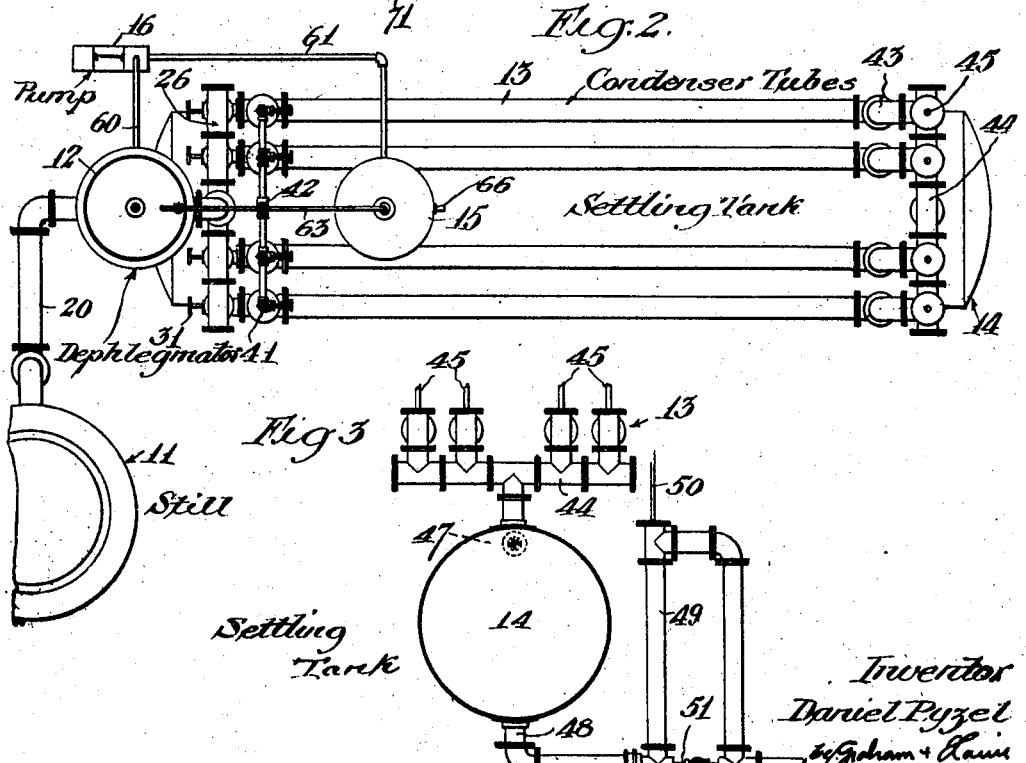

1,811,645

UNITED STATES PATENT OFFICE

DANIEL PYZEL, OF OAKLAND, CALIFORNIA, ASSIGNOR, BY MESNE ASSIGNMENTS, TO SHELL DEVELOPMENT COMPANY, OF SAN FRANCISCO, CALIFORNIA, A CORPORATION OF DELAWARE

OIL REFINING SYSTEM

Application filed December 27, 1920, Serial No. 433,099. Renewed October 22, 1929.

My invention relates to the refining of crude petroleum or petroleum products. An object of my invention is to provide means by which oil vapors may be readily condensed using sea water or other water containing foreign matter in solution or suspension. This, I accomplish by passing the vapors to be condensed through a closed conduit filled with the sea water or other impure water, so that the water and vapors are in direct contact with each other and the vapors condense into a liquid which is mixed with the cooling water. Other inventors have attempted to accomplish the same result but have wholly or partially failed due to the tendency of the condensed oil vapor to form emulsions with the water, these emulsions being more or less fixed and difficult to separate into their components oil and water. It is an object of my invention to provide means for preventing the formation of "tight" or fixed emulsions.

Further objects and advantages will be made evident hereinafter.

Referring to the drawings which are for illustrative purposes only,

Fig. 1 is a diagrammatic side elevation of one embodiment of my invention.

Fig. 2 is a plan view of the same, and

Fig. 3 is an end view taken in the direction of the arrow 30, Fig. 1.

Broadly considered, my invention consists of a still 11, a dephlegmator 12, a series of condenser tubes 13, a settling tank 14, a cooler 15 and a pump 16.

The still 11 may be of any convenient form, oil vapors being taken therefrom through a pipe 20 and directed to the bottom of the dephlegmator 12 which is provided with a series of shallow pans 21 having the form shown in Fig. 1. The vapors rise through the openings 22 in one series of pans 23 passing around the peripheries of the intermediate pans 24, the vapors being finally delivered into a header 26. This header, in the form shown, has four small pipes 30 connected therein, each pipe being provided with a valve 31. Each of the pipes 30 terminate in a nozzle 32, each nozzle projecting into one of the condenser tubes 13.

The condenser tubes 13 are preferably made of cast iron and are each provided with a water inlet pipe 40 having a valve 41 and connected with a water supply pipe 42.

The condenser tubes 13 are each provided with an elevated end 43 which is connected into a header 44 vented as shown at 45. The header 44 is connected into a pipe 46 which extends down into the bottom of the settling tank 14 near one end thereof. The settling tank 14 is provided at the opposite end of the pipe 46 with an oil outlet pipe 47 and a water outlet pipe 48. The oil outlet pipe is connected into the top of the tank. The water outlet pipe 48 is connected into the bottom of the tank, water passing through a U shaped bend 49 which is vented at 50. A by-pass valve 51 allows the tank to be entirely empty of water if desired.

A pipe 60 is connected to the bottom of the dephlegmator 12 with the suction side of the pump 16, the pressure side of this pump being connected through a pipe 61 with the bottom of a coil 62 in the cooler 15. The top of the coil 62 is connected through a pipe 63 with a nozzle 64 in the top of the dephlegmator 12. Cooling water is admitted to the cooler 15 through a pipe 65 and withdrawn through a pipe 66.

The method of operation is as follows:

The hot vapors containing both light and heavy oils pass through the pipe 20 into the bottom of the dephlegmator 12. The vapors pass upwardly therethrough and being directly brought into intimate contact with cold condensates carried in the pans 23 and 24. This condensate runs down into the bottom of the dephlegmator and is forced through the pipe 60 and 61 into the cooler 15 where it is thoroughly cooled, being then delivered into the top pan of the dephlegmator through the cooler 64.

By thus circulating the condensates through the cooler 15, it is possible to keep the interior of the dephlegmator at a low temperature and to condense and collect from the vapors practically all of the heavier oil vapors. Heavy condensates are taken off through a pipe 71 controlled by a valve 70, this valve being left slightly open so that there is a continuous flow of heavy condensates therefrom. The light vapors which will not condense in dephlegmator 12 are delivered through the nozzle 32 into the interior of the condenser tubes 13. The condenser tubes are kept full of water which is admitted through the pipe 40 and the water and vapor travel in the same direction inside the tubes. The valves 31 are regulated to produce large bubbles of gas which are condensed into liquid form in their travel in the water in tubes 13.

The combined water and condensates are delivered through the pipe 46 to the settling tank 14. In this tank the oil and water separate, the oil rising to the top and passing off through the pipe 47, the water being drawn off through the pipe 48.

It is possible by using my invention to use extremely dirty water or even sea water in the tubes 13, thus greatly reducing the cost of cooling and making it possible to locate oil refining plants where there is no supply of pure cooling water. Some of the oil vapors delivered from the still 11 through pipe 20 may be very heavy. If the vapors from the still were passed directly into the tubes 13, the heavy condensates would form troublesome emulsions with the cooling water.

By the use of the dephlegmator I am able to remove from the vapor all of these heavy condensates which would otherwise form emulsions. The light vapors which pass into the tubes 13 are of such a character that they do not tend to form emulsions but readily settle out in the settling tank 14.

In practice the pump 16 is used to prevent emulsification being speeded up to reduce the temperature of the dephlegmator 12 and thus remove more heavy vapors in the event that the operator finds any emulsification occurs.

I claim as my invention:

1. An improvement in the art of treating hydrocarbon oil vapors containing constituents which upon condensation would form emulsions with water comprising introducing the vapors to a dephlegmating column, removing condensate from the dephlegmating column, placing the same under a mechanical pressure, passing such condensate thence through a cooling zone and returning the cooled condensate to the dephlegmating column, maintaining the rate of circulation of said condensate from said dephlegmating zone through said cooling zone and back to said dephlegmating zone such that the vapors escaping from the dephlegmating column will be free of said constituents.

2. In the condensation of hydrocarbon vapors containing constituents which on condensation emulsify with water, the method which comprises passing the vapors thru a dephlegmating zone and controlling the condensation therein so as to condense from the vapors the constituents emulsifiable with water, removing the resultant condensate from said zone, cooling at least a portion of said condensate and returning the same to said dephlegmating zone to serve as a dephlegmating medium for the vapors therein, removing uncondensed vapors from said dephlegmating zone and bringing the same into direct contact with water to effect condensation thereof, and separating the condensed vapors from the water.

In testimony whereof, I have hereunto set my hand at the city and county of San Francisco, California, this 20th day of December, 1920.

DANIEL PYZEL.